United States Patent
Heil et al.

(10) Patent No.: US 8,229,718 B2
(45) Date of Patent: Jul. 24, 2012

(54) USE OF SCIENTIFIC MODELS IN ENVIRONMENTAL SIMULATION

(75) Inventors: Andreas Heil, Linkenheim (DE); Mark Peasley, Kirkland, WA (US); Vassily Lyutsarev, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 12/342,870

(22) Filed: Dec. 23, 2008

(65) Prior Publication Data

US 2010/0161295 A1 Jun. 24, 2010

(51) Int. Cl.
*G06G 7/48* (2006.01)
(52) U.S. Cl. ............. 703/6; 434/151; 345/630; 345/633
(58) Field of Classification Search ...... 703/6; 434/128, 434/150, 151; 345/619, 629, 630, 632, 633
See application file for complete search history.

(56) References Cited

U.S. PATENT DOCUMENTS

| | | | |
|---|---|---|---|
| 6,229,546 B1 | 5/2001 | Lancaster et al. | |
| 6,910,892 B2 | 6/2005 | Lechner | |
| 7,239,311 B2 | 7/2007 | Dunn et al. | |
| 7,412,362 B2 | 8/2008 | Hu et al. | |
| 7,414,629 B2 | 8/2008 | Santodomingo et al. | |
| 7,752,559 B1* | 7/2010 | Szpak et al. | 715/764 |
| 7,899,915 B2* | 3/2011 | Reisman | 709/228 |
| 7,913,222 B2* | 3/2011 | Ogilvie et al. | 717/106 |
| 7,987,491 B2* | 7/2011 | Reisman | 725/112 |
| 2002/0005111 A1* | 1/2002 | Ludwig | 84/645 |
| 2003/0066026 A1 | 4/2003 | Jaffe | |
| 2003/0176977 A1 | 9/2003 | Allen et al. | |
| 2005/0202861 A1 | 9/2005 | Dougherty et al. | |
| 2007/0087756 A1* | 4/2007 | Hoffberg | 455/450 |
| 2007/0100475 A1* | 5/2007 | Korchinski | 700/28 |
| 2007/0168927 A1* | 7/2007 | Campbell et al. | 717/104 |
| 2007/0206005 A1 | 9/2007 | Phelps | |
| 2008/0109779 A1 | 5/2008 | Moriat | |
| 2010/0057415 A1* | 3/2010 | Chu et al. | 703/6 |

OTHER PUBLICATIONS

Wang et al., Research on Database Technologies of Synthetic Natural Environment, Asia Simulation Conference—7th International Conference on System Simulation and Scientific Computing, Oct. 2008, pp. 1329-1333.*
"ArcGIS", retrieved on Oct. 17, 2008 at <<http://en.wikipedia.org/wiki/ArcGIS>>, Wikipedia, 7 pages.
"ArcGIS Improves Your Workflows", retrieved on Oct. 17, 2008 at <<http://www.esri.com/software/arcgis/>>, ArcGIS—A Complete Integrated System, 2 pages.
Bolin, et al., "Scope 13—The Global Carbon Cycle", retrieved on Oct. 17, 2008 at <<http://www.icsu-scope.org/downloadpubs/scope13/chapter01.html>>, 65 pages.

(Continued)

*Primary Examiner* — Russell Frejd
(74) *Attorney, Agent, or Firm* — Lee & Hayes, PLLC

(57) ABSTRACT

Use of scientific models to generate graphical virtual environments is described. In an embodiment at least two different scientific models are used. Input data which is representative of a real world environment is used by a first scientific model, such as a climate model, and data output by the first scientific model is then fed into a second, different, scientific model, such as an ecological model, in order to generate simulation data. The simulation data, which may, for example, detail the required population density of particular plant species and their size and age, is then used by a graphical simulation engine to generate a graphical virtual environment which may, for example, be used in a computer game such as a flight simulation game.

19 Claims, 7 Drawing Sheets

OTHER PUBLICATIONS

"Compartmental models in epidemiology", retrieved on Oct. 17, 2008 at <<http://en.wikipedia.org/wiki/Compartmental_models_in_epidemiology#The_SIR_model>>, Wikipedia, 18 pages.

Deussen, et al., "Realistic modeling and rendering of plant ecosystems", retrieved on Oct. 17, 2008 at <<http://www-graphics.stanford.edu/papers/ecosys/ecosys.pdf>>, 12 pages.

"EcoMod", retrieved on Oct. 17, 2008 at <<http://sourceforge.net/projects/ecomod/ >>, SourceForge, Inc., 1999-2008, 1 page.

Hammes, et al., "Modeling of ecosystems as a data source for real-time terrain rendering", retrieved on Oct. 17, 2008 at <<http://mzone.mweb.co.za/residents/jhammes/nineteen70five/hammes.pdf>>, Stellenbosch, South Africa, 13 pages.

"MM5 Community Model", retrieved on Oct. 17, 2008 at <<http://www.mmm.ucar.edu/mm5/mm5-home.html>>, UCAR 2003, 2 pages.

"National Centers for Environmental Prediction (NCEP) EMC Model Documentation", retrieved on Oct. 17, 2008 at <<http://www.emc.ncep.noaa.gov/modelinfo/>>, 2 pages.

Purves, et al., "Predictive Models of Forest Dynamics", retrieved on Sep. 26, 2008 at <<www.sciencemag.org>>Science Magazine, vol. 320, Jun. 13, 2008, pp. 1452-1453.

Sherratt, et al., "Periodic travelling waves in cyclic populations: field studies and reaction-diffusion models", Journal of the Royal Society Interface, 2008, 5, pp. 483-505.

Sibly, et al., "On the Regulation of Populations of Mammals, Birds, Fish, and Insects", <<www.sciencemag.org>>, Science Magazine, vol. 309, Jul. 22, 2005, pp. 607-610.

Szofran, "Global Terrain Technology for Flight Simulation", retrieved on Oct. 17, 2008 at <<http://download.microsoft.com/download/5/6/f/56f5fa07-51a4-4c0d-8a9a-2e8539214f2e/GDC2006_Szofran_Adam_Terrain_v1.doc>>, 21 pages.

Szofran, "Global Terrain", retrieved on Oct. 17, 2008 at <<http://www.fsinsider.com/developers/Pages/GlobalTerrain.aspx>>, Microsoft Flight Simulator, Microsoft Game Studios, 10 pages.

"TerrainView-Lite 3.2.4", retrieved on Oct. 17, 2008 at <<http://www.softpedia.com/get/Multimedia/Graphic/Graphic-Others/TerrainView-Lite.shtml, 3 pages.

"Terrestrial Ecoregions of the World", retrieved on Oct. 17, 2008 at <<http://www.nationalgeographic.com/wildworld/terrestrial.html>>, National Geographic, Wild World, 1 page.

Zamuda, et al., "Modelling, Simulation, and Visualization of Forest Ecosystems", retrieved on Oct. 17, 2008, at <<http://ieeexplore.ieee.org/iel5/4400217/4400218/04400683.pdf>>, EUROCON 2007, The International Conference on "Computer as a Tool", Warsaw, Sep. 9-12, pp. 2600-2606.

PCT International Search Report dated Jun. 29, 2010 from corresponding PCT International Application No. PCT/US2009/069315 filed Dec. 22, 2009.

* cited by examiner

USE OF SCIENTIFIC MODELS IN ENVIRONMENTAL SIMULATION

BACKGROUND

Many computer games engines provide a 3D (three-dimensional) graphical simulation of the earth through which the player can navigate. Generation of the simulated environment involves a lot of manual work, including manual positioning of terrain elements such as mountains, lakes and forests. For highly detailed views of the simulated environment, 3D objects may be placed manually within the environment; these objects may be individual trees or buildings or shapes may be defined along with sets of objects (e.g. trees) which are to populate the shape and a simulation engine may then automatically populate the shape with objects from the defined sets. This process is very complex and time consuming and must be repeated for each new version of the game/simulation engine.

In order to reduce the amount of manual work required, data may be obtained from aerial imagery or existing 3D models (e.g. Microsoft® Virtual Earth™). However, the information used within a simulation engine is usually highly optimized (e.g. restricted polygon counts or optimized texture maps) and therefore the existing data is generally not usable or, as is the case for aerial imagery, still requires a considerable amount of hand editing and cannot be processed automatically.

The embodiments described below are not limited to implementations which solve any or all of the disadvantages of known methods of generated simulated graphical environments.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Use of scientific models to generate graphical virtual environments is described. In an embodiment at least two different scientific models are used. Input data which is representative of a real world environment is used by a first scientific model, such as a climate model, and data output by the first scientific model is then fed into a second, different, scientific model, such as an ecological model, in order to generate simulation data. The simulation data, which may, for example, detail the required population density of particular plant species and their size and age, is then used by a graphical simulation engine to generate a graphical virtual environment which may, for example, be used in a computer game such as a flight simulation game.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
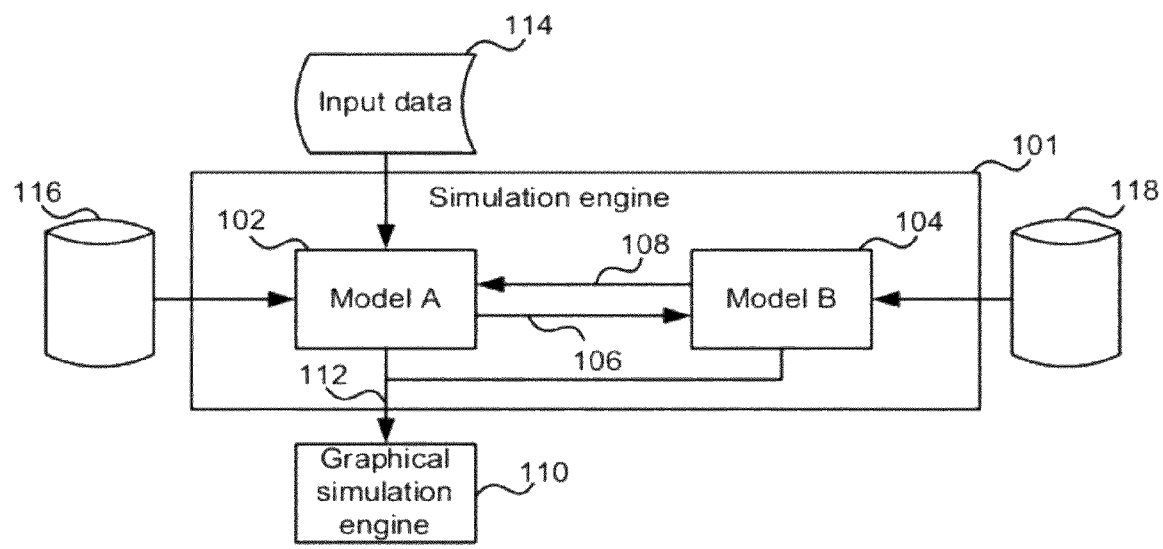
FIG. 1 is a schematic diagram of a system for generating a graphical virtual environment.

FIG. 1 is a schematic diagram of a system 100 for generating a graphical virtual environment, such as a simulated graphical world which may, for example, be used in a computer game or a training/educational tool. The system 100 comprises a simulation engine 101 which is based on at least two scientific models 102, 104. A scientific model (such as scientific models 102, 104) typically comprises a mathematical representation of mechanisms or dynamics occurring in physical systems and are used to make predictions about or improve understanding of the physical system. They are often parameterized with data from real systems (e.g. they may comprise an algorithm or set of rules that has been generated using real world data to model an aspect of the real world, e.g. forest growth, climate, snowfall etc) and their predictions are often tested against real data sets (e.g. against known values for climate, snowfall etc). Examples of scientific models include the forest models described in 'Predictive Models of Forest Dynamics' by Purves and Pacala (published in Science, Vol. 320), the logistic equation which is an animal population model and is described in 'On the Regulation of Populations of Mammals, Birds, Fish and Insects' by Sibly et al (published in Science, Vol. 309), the Rosenzweig & MacArthur model on population-prey interaction (e.g. as described in 'Periodic Travelling Waves in Cyclic Populations: field studies and reaction-diffusion models' by Sherratt and Smith, published in the Journal of the Royal Society Interface (2008) 5, 483-505), the SIR disease model (e.g. as described at http://en.wikipedia.org/wiki/Compartmental_models_in_epidemiology#The_SIR_model) and the MM5 Community Model which may be used to predict and calculate atmospheric changes. In an example, an ecological model providing information about vegetation may be combined with a climate model. Based on the climate data of multiple years, the appearance of the vegetation is calculated by the ecological model.

The scientific models interact by sharing data (as indicated by arrows 106, 108), such that data which is output from one of the scientific models is used as input data to another scientific model. In an example, the first model may be a plant model and the second model may be an animal model. The plant model may determine the plants in a particular area (e.g. palm trees at sea level and conifers in the mountains) and based on this plant information, the animal model may determine the species of animals that would inhabit a particular area. The models may be chained, e.g. such that data from model A feeds into model B (arrow 106), and there may also be feedback, e.g. such that data from model B is fed back as an input for a further iteration of model A (arrow 108). Using the simple example above, this feedback may result in the presence of the animals having an effect on the plants growing in a particular area. In order that data can be shared between scientific models, a data structure referred to herein as a 'scientific data set' (SDS) is used. This scientific data set provides a common data model with a uniform interface to heterogeneous data generated by different scientific models. Each data element within the scientific data set may have associated metadata. The metadata may describe the real data used by the scientific models such that the different models can find the data that they require. The metadata may in addition, or instead, provide details of the provenance of the values of the different data elements, e.g. how the value has changed, which scientific model resulted in the change etc, so that scenarios can be re-run (as it is possible to reconstruct previous versions of the scientific data set).

Examples of data that may be stored in a scientific data set include: a three-dimensional array of air temperature values. The metadata to such an array may specify that the first dimension refers to different latitudes, second dimension refers to longitudes and the third dimension refers to moments in time. Additionally, metadata may specify that data in degree Celsius units and that it is computed by the MM5 meso-scale weather model. Additional three data arrays may provide actual latitude, longitude and time values that correspond to individual layers, rows and columns of the temperature array. This same data set may have three arrays that represent diameters, heights and densities for cohorts of trees at particular forest plot in particular year.

Figure 2:
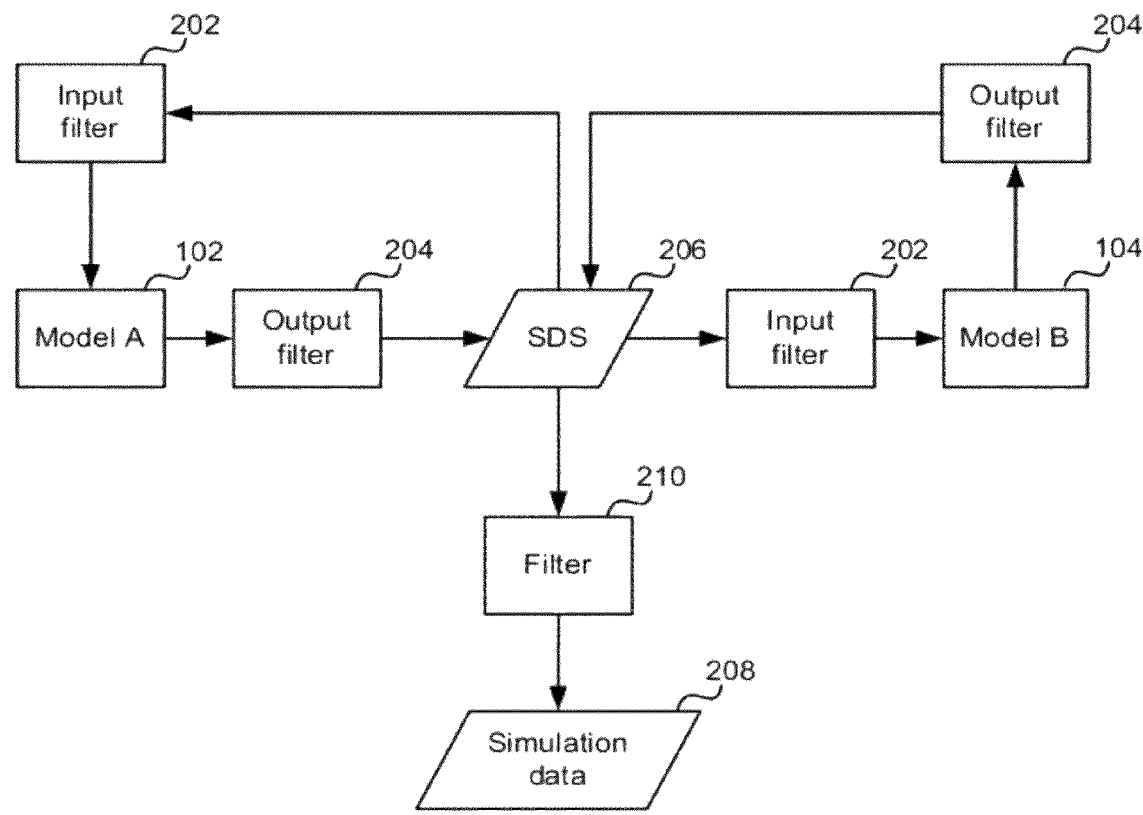
FIG. 2 is a schematic diagram of a portion of a system for generating a graphical virtual environment.

As the scientific data set includes data elements for multiple scientific models, any particular scientific model may only read and write values for a subset of the data elements. Typically a scientific model comprises an algorithm with five or six input parameters. In order to facilitate this, input and/or output filters 202, 204 may be used, as shown in FIG. 2. An input filter 202 extracts the required input data elements for a particular scientific model from the scientific data set 206 (e.g. by selecting a particular subset from a particular array) and performs any necessary formatting which is required by the scientific model. An output filter 204 takes the output data from a scientific model and formats the data so that it can be written to the scientific data set 206. The output filter 204 may also generate metadata associated with any data elements which are modified and this metadata may replace or be appended to any existing metadata within the scientific data set. A more advanced filter (whether input/output) may perform data transformations, such as aggregation and/or interpolation. In some examples, input and/or output filters may not be required.

The system 100 also comprises a graphical simulation engine 110 (e.g. a Direct X based 3D simulation engine) which receives simulation data from simulation engine 101 (i.e. from the combination of the scientific models, as indicated by arrow 112) and generates the graphical virtual environment. The simulation data defines the objects which are to be placed in a particular area of the virtual environment and also defines attributes of the objects such as population, distribution, appearance, size and age, e.g. for a region of forest, the simulation data may define the tree type, tree age/size and the number of each particular type/age/size. The content of the simulation data will depend on the scientific models used (e.g. it may define animals where animal population models are used) and the input data. The simulation data 208 may be generated by transforming the data in the scientific data set using a filter 210 (as shown in FIG. 2). This filter 210 transforms (or extracts) the data in the scientific data set into the format required by the graphical simulation engine 110 and may operate as an input filter for the graphical simulation engine (in an analogous manner to input filter 202). The exact operation of the filter 210 will be dependent upon the API of graphical simulation engine.

The graphical simulation engine 110 converts the simulation data to a graphical virtual environment. This may be done using a library of graphical representations of objects, e.g. trees of different species, different ages, viewed in different seasons etc. These graphical representations of objects may be placed into an environment according to the attributes defined within the simulation data. The system may, for example, use an existing graphical simulation engine which has been developed for use in a computer game or for use in developing a computer game (e.g. the graphical simulation engine used by Microsoft® Flight Simulator).

FIG. 1 shows a number of arrows between elements (e.g. arrows 106, 108) which indicate data flow. Whilst single ended arrows have been used by way of example only, it will be appreciated that communication between any of the elements shown may be unidirectional (in either direction) or bidirectional and data may flow in directions and between elements in addition to (or instead of) the data flows shown in FIG. 1.

The operation of this system 100 can be described with reference to the flow diagram shown in FIG. 3. Input data 114, which may be real world data, is imported into a first scientific model 102 (block 302) and the scientific model is run using this input data 114 and any other required input data, such as simulation specific data and/or user-defined parameters 116 (block 304). The results of running the scientific model are output into a scientific data set (block 306) which is then used as input data for a second scientific model. The second scientific model 104 imports data from the scientific data set (block 308) and may also import other input data, such as the original input data 114 and/or any required simulation specific data and user-defined parameters 118. The imported data is used to run the second scientific model (block 310) and the results are output into the scientific data set (block 311). Having run the combination of the two scientific models 102, 104, simulation data may be generated (block 312) and this simulation data is used by a graphical simulation engine 110 to generate a graphical virtual environment (block 314). As described above, the generation of the simulation data (in block 312) may a data transformation or data extraction process and may be considered to be part of a read operation by the graphical simulation engine 110 from the scientific data set. In many examples this graphical virtual environment is a 3D graphical environment; however, the system 100 and method may also be used to generate other graphical representations of the environment.

Using a system and method as described above, a graphical virtual environment may be generated by using the scientific models to vary an ecosystem or biome based on various parameters. The graphical virtual environment may be generated automatically or with reduced manual operations. Instead of choosing from a set of predefined plants suitable for a certain season (where the set must be manually defined and this is both labor intensive and provides an opportunity for errors to be introduced), the scientific models may be used to provide the appropriate vegetation based on the input parameters (seasons, climate data etc) for a particular part of the world. Furthermore, as described below, the scientific models may be used to change the environment in a dynamic manner, e.g. to show what an area might look like 50 years in the future or 100 years in the past, and/or to dynamically adapt the environment during game play (e.g. as a result of user interaction with the environment within the game or as a result of human footprint impacts, such as deforestation in a given area, where this data is available as an external data set).

Figure 3:
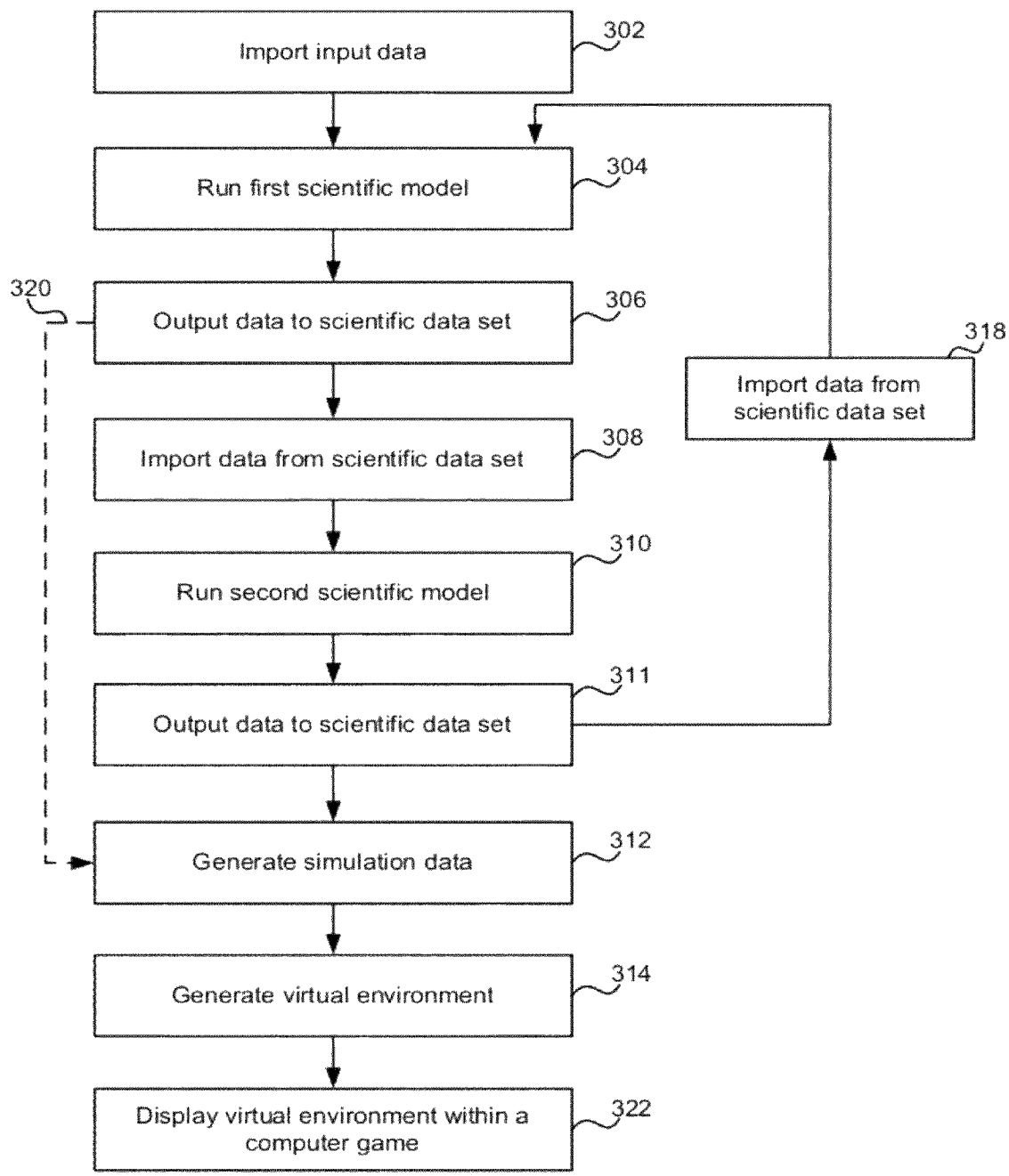
FIG. 3 is a flow diagram of an example method of operation of a system for generating a graphical virtual environment.

In some examples, there may be feedback from the second scientific model back into the first scientific model, as is also shown in FIG. 3. In such an example, the second scientific model 104 outputs data to the scientific data set (block 311) and data from this updated scientific data set is then imported into the first scientific model 102 (block 318) before it is re-run (block 304). Following the second iteration of the first scientific model (in block 304), the results are output to the scientific data set (in block 306). Other aspects of the method may be repeated (e.g. a second iteration of the second scientific model, blocks 308-311) or alternatively the output of the first scientific model, in the form of the updated scientific data set (from block 306) may be used to generate the simulation data (in block 312, as indicated by dotted arrow 320).

There are many different applications for the graphical virtual environment which is generated using the methods described above (e.g. method blocks 302-314 or blocks 302-318) and one example application is for generation of a 3D graphical environment for use in a computer game, such as a flight, train, driving or other simulation game. The graphical virtual environment may alternatively be used in an educational or training tool (e.g. within Microsoft® ESP™). Such tools may be used in a number of different ways: the tool may enable observation of the results of a combination of scientific models, e.g. to enable data to be cycled through; and in another example, the tool may be used in a speculative/predictive manner to see the effects of adding/changing models. In some examples, the system may enable comparison of simulation results (where the simulations may be run sequentially or substantially in parallel) to enable the user to observe differences in the rendered graphical virtual environment. In such applications, the method may further comprise displaying the graphical virtual environment to a player of the particular computer game (block 322) or to a user of the educational or training tool.

Figure 4:
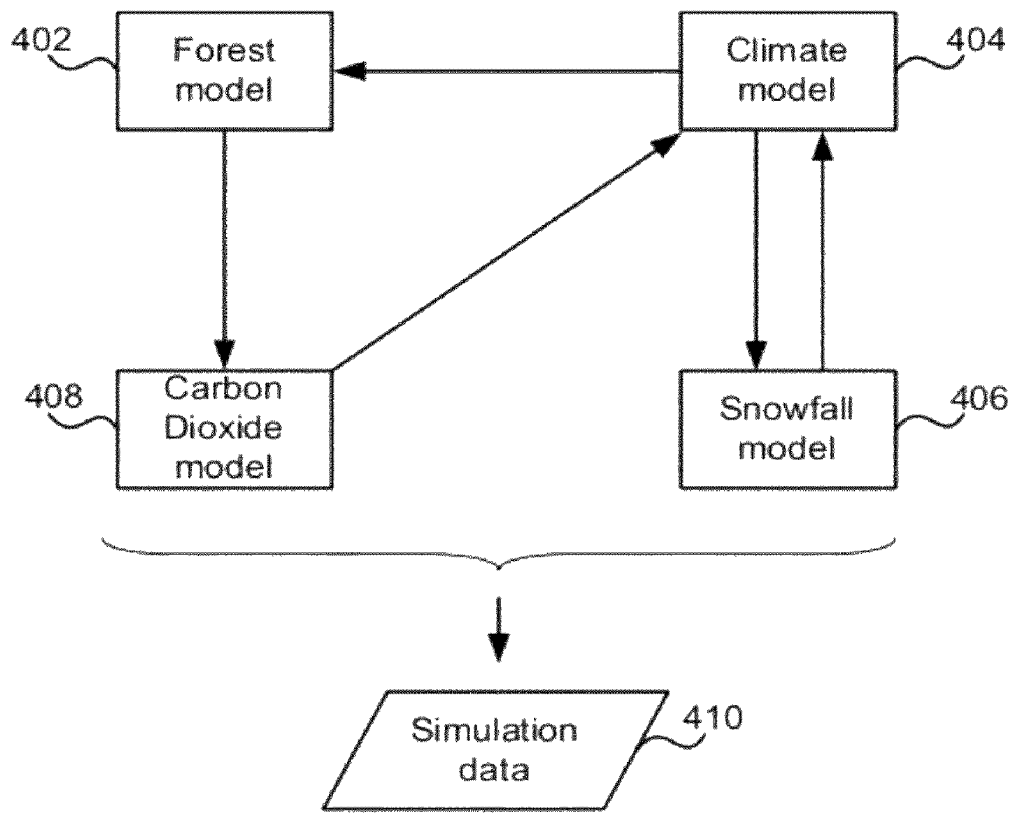
FIG. 4 is a schematic diagram of a network of four scientific models.

It will be appreciated that although FIG. 3 shows a combination of two scientific models being used to generate the simulation data, this is by way of example only and more than two scientific models may alternatively be used. Where more than two scientific models are used, there may be feedback between models in any manner. FIG. 4 shows an example of a network of four models: a forest model 402 (e.g. as described in 'Predictive Models of Forest Dynamics' by Purves and Pacala and referenced above), a climate model 404 (e.g. the MM5 Community Model), a snowfall (or other climate/weather) model 406 (e.g. the Global Forecast System (GFS) which can be found at http://www.emc.ncep.noaa.gov/modelinfo/) and a carbon dioxide model 408 (e.g. as described in 'The Global Biogeochemical Carbon Cycle' by Bolin et al and which can be found at http://www.icsu-scope.org/downloadpubs/scope13/chapter01.html). In the example shown, the climate model 404 interacts directly with the snowfall model 406, e.g. because the climate is a factor in determining snowfall (e.g. in addition to ground elevation information, which may also be imported into the snowfall model as part of the input data) and the amount of snowfall will affect the reflection of sunlight which in turn influences the temperature (part of the climate model). The climate model 404 also provides data which is used as an input to the forest model 402 which in turn provides data which is used as an input to the carbon dioxide model 408. Output from the carbon dioxide model feeds back into the climate model 404. In all cases, the interaction between scientific models within the network is via the scientific data set, with a first model writing to the scientific data set and another model reading some or all of that data from the scientific data set. Where two models can operate independently (e.g. where they do not write to the same data elements within the scientific data set), it may be possible to run the scientific models in parallel, rather than requiring serial operation (as is shown in FIG. 3).

In a system it may be necessary to perform a number of iterations initially to arrive at a stable position (e.g. because of the complex interaction between scientific models as shown in the example of FIG. 4). Once the required scientific models have been run, the resultant output from the combination (or network) of scientific models is used to generate the simulation data 410. It is this simulation data 410 that is used by a graphical simulation engine (e.g. graphical simulation engine 110 in FIG. 1) to generate the graphical virtual environment. In some implementations, the scientific models may be used to generate and/or modify the virtual environment at runtime (e.g. at runtime of the computer game). In situations where a number of iterations are initially required to arrive at a stable position (e.g. at stable values in the scientific data set or stable simulation data), these initial iterations may be run at design time and the results of these initial iterations (e.g. the resultant scientific data set and any other simulation specific data) may be used as the input data 114 to the system at runtime.

It will be appreciated that different scientific models require different input data in order to be able to be run. This input data may include data imported from the scientific data set (e.g. as in blocks 308 and 318) or any other source and any or all of the scientific models used within the system may import input data from various sources. These data sources may be external to the system (e.g. input data 114 and data sources 116 and 118 in FIG. 1). The external data sources 116, 118 may be stored locally (e.g. provided within a computer game) or may be remote databases, such as may be provided by online services and accessed across a network (e.g. over the internet). An example of such a remote database is a climate database which provides climate data (e.g. in MM5 format for use by the MM5 Community Model) for approximately the past 50 years. Where an online service is used, the service may provide the data on demand and the system 100 may download selected data from the service (e.g. data for a particular date) and this downloaded data may be used to create new environmental information on the local system. The online service may be provided free of charge or it may be necessary for the user to pay for the downloaded data.

In some examples the input data (or a subset thereof) may reflect the real world, e.g. actual geographical information such as elevation, land classes for a particular region, historical climate data etc, or may describe an imaginary world (e.g. for computer games played in fantasy worlds). In an example, the input data may describe the typical vegetation for a certain area and ecosystem of the world. Further examples of real world data sets include the World Geodetic System (WGS84) and USGS LIDAR (Light Detection and Ranging). There are also large databases giving weather station data, weather 'reanalysis' products (e.g. The International Satellite Land-Surface Climatology Project, ISLSCP), climatology (e.g. from the Climatic Research Unit, CRU), and giving results of Earth System Models (e.g. IMOGEN). Species databases include national forest inventories (e.g. the US Department of Agriculture Forest Service's Forest Inventory and Analysis, USDA FIA) and specimen databases (e.g. the Global Biodiversity Information Facility and the Natural History Museum and Kew Gardens in the UK). There are databases of protected areas and national parks (e.g. the Water Program for Africa and Arid and Water scarce Zones, courtesy of the United Nations Environmental Program—World Conservation Monitoring Center) and databases of global land-use (e.g. HYDE and related products). In terms of size, each of these is dwarfed by satellite data, e.g. the 'MODIS' product contains data for each 8-day period, for each 1×1 km grid-cell on Earth, for a total of 8 years (further information on satellite data can be found at: http://www.geos.ed.ac.uk/research/eochem/sat.html).

The data sources 116, 118 may include simulation specific data such as details of 3D objects within the simulation and the real world attributes assigned to each object (e.g. the distinct ecological community it is prevalent in, growth rates, preferred moisture content in soil, tendency to clump or grow in groups, elevation preferences etc) or user-defined parameters (e.g. details of man-environment interaction such as forest fires, forest clearance etc). In an example, the simulation specific data may comprise an overlay detailing modifications to any real world data which is imported (e.g. an artificial increase in all the temperature data by 2° C., removal of a particular species, industrial or urban impacts etc).

The input data and input parameters may be changed in order to change the output of the model. The values of the user-defined parameters may affect the input data which is imported by a scientific model, e.g. where a user defines a time, such as a year, for the virtual environment, the scientific models may import climate data for the selected year (or for a period prior to that year). As described above, the scientific models may be used to modify and/or generate the virtual environment at runtime based on the input data which may include user input parameters such as a date or year. As a result the virtual environment may be adapted to appear corresponding to the input data for the particular date or year selected by the user. The graphical virtual environment may also be modified using the methods described herein during game play due to user interaction with the game or environment. Such modifications may result in changes to user-defined parameters which are inputs to the network of scientific models used to produce the simulation data.

Figure 5:
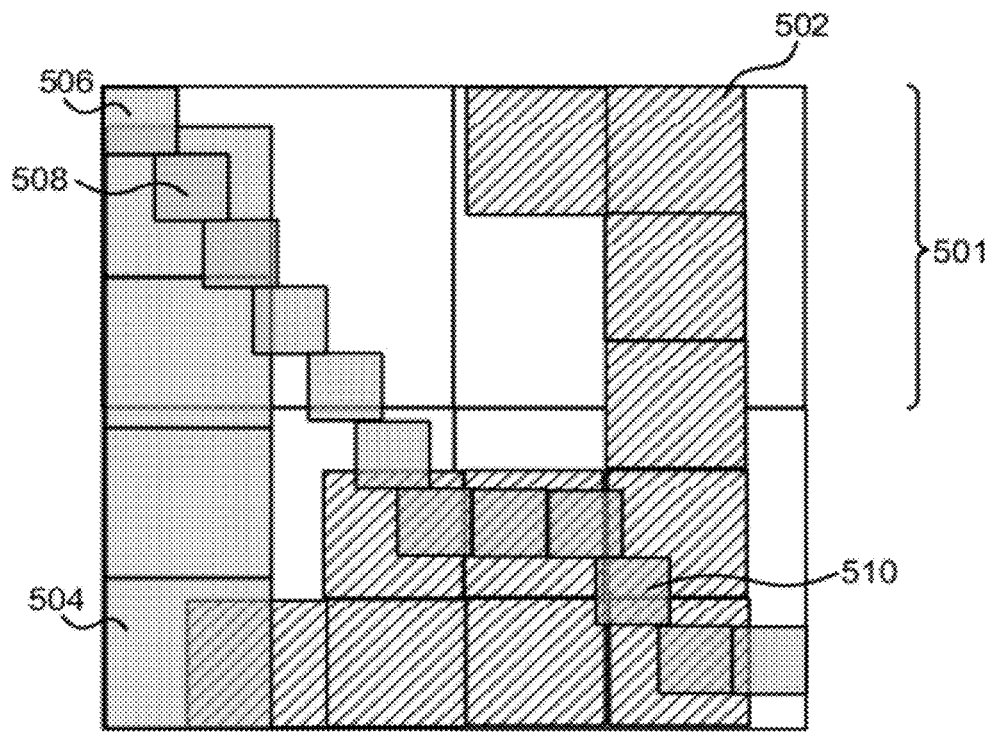
FIG. 5 is a schematic diagram showing overlaid scientific models for different parts of a virtual environment.

When generating a virtual environment, as described above, different scientific models and different combinations of scientific models may be used for different regions of the environment. For example, the forest model 402 may only be used in regions of forest and a river model (not shown in FIG. 4) may be used to model the flow (e.g. water level, erosion etc) where there is a river (which may be defined by real world data or simulation specific data). FIG. 5 shows a plan diagram of a virtual environment including the overlapping scientific models which may be used in its generation. Typically the world in a simulated environment is segmented into tiles of a similar size, e.g. the large tiles 501. This basic simulation information, which may for example be generated as described in 'Global Terrain Technology for Flight Simulation' by A. Szofran (and which can be found at http://www.f-sinsider.com/developers/Pages/GlobalTerrain.aspx), may provide data such as information about terrain, land classes and surface types. The scientific models, however, which are included within the system described herein may provide various different scales (resulting in various different tile sizes) depending upon the real-world (or other input) data which is available. For example, this might range from 20×20 m to 700×700 m, with other data being available in 10×10 km to 200×200 km squares. The data from the different scientific models is overlaid and the different layers are combined (through the interaction between models, as described above) to improve the coverage and the quality of the resultant graphical virtual environment.

In the example in FIG. 5, basic simulation information (in tiles 501) is combined with information from three scientific models in tiles 502, 504, 506. It can be seen that in some regions, a single scientific model is used in addition to the basic simulation information; however in other areas there is overlap (e.g. areas 508, 510) and here more than one scientific model interacts (as described above) in order to generate the virtual environment for the particular region. In a specific example, FIG. 5 shows three models, which may, for example, be: a first model (tiles 502) providing information about forest growth, a second model (tiles 504) providing information about which bushes and shrubs are typical for the region and a third model (tiles 506) which is a river model. Details of which model is applied to which region (e.g. data representative of the information shown graphically in FIG. 5) is provided to the simulation engine (e.g. simulation engine 101), for example as part of the simulation specific data. This data may be provided using the coordinate set for the simulation.

In addition to, or instead of, using different scientific models for different regions of the virtual environment, it will be appreciated that different input data may be used for different regions.

In order to reduce any wait at runtime whilst the graphical virtual environment is generated using the methods described above, some or all of the data calculated using one or more models or parameters may be pre-calculated. The pre-calculated data may be used to initially generate a virtual environment at runtime which may then be subsequently modified (at runtime, e.g. whilst a computer program is being played) using the combination of two or more scientific models, as described above. Whilst use of pre-calculated data may result in faster load of the virtual environment at runtime and eliminate or reduce delays, this usually requires more data storage and therefore may not be suited to memory constrained applications. However, use of the techniques described herein without pre-calculation (where the term 'pre-calculation' does not include use of iterations at design time to generate the initial input data used at runtime) may result in reduced data storage, because the input data set required to generate the graphical virtual environment at runtime using the combination of scientific models is not very large.

An initial system may comprise a set of scientific models which are used in generating the virtual environment as described above. As described above, any combination of two or more of the scientific models may be used for particular regions of the environment and there may be some regions where only one model is used (e.g. as shown in the representation in FIG. 5). New models may subsequently be added to the system either to replace existing scientific models or to supplement those already within the system, e.g. to provide an improved virtual environment (e.g. in terms of accuracy, detail etc). This provides the ability to upgrade the system and as a result upgrade the resultant graphical virtual environment, without requiring manual regeneration of the entire environment. If all the scientific models are able to read from and write to the scientific data set, either with or without the use of input/output filters, then the scientific models can interact in a manner as described above.

Through use of the scientific models at runtime to generate the graphical virtual environment (as described above), the system may further be arranged to extrapolate from available data in time (either forwards or backwards). In such a scenario, the scientific models (e.g. the forest model referred to above) may be run to predict parameters associated with the virtual environment at time t+x or t−x based on data available for time t (where x may be any value and may, for example, be user defined). In some examples, the user interface may provide a user with a slider to enable the user to dynamically modify the generated virtual environment at runtime, e.g. with the changing position of the slider corresponding to a changing value of x. In some examples, different scientific models may be used for different periods of time, in a similar manner to use of different scientific models for different geographical regions.

There are many example applications for a system which is arranged to incorporate these aspects of time into the generation of the graphical virtual environment. Examples include utilizing annual rainfall/moisture data to impact vegetation distribution of a given area based upon the current conditions (e.g. a drought in a specific region or seasonal die-offs of certain vegetation types) or utilizing moisture and wind/weather data to affect a simulation running within the virtual world such as a forest fire simulation. This data could be utilized to do predictive scenarios such as what the fire looks like in the next 24-48 hours, or for analysis of past incidences based upon known data sets.

The following description provides a simple example of an implementation the model chaining. In this example, each scientific model comprises a mathematical function to calculate one or more parameters:

M1 (a, b, c, t)
M2 (i, j)
M3 (x, y)

The input and output of each function may be a single value, a vector or matrix. This example uses time in model M1 (variable t). Model M2 is calculated based on some observed data (variable i) and the output of model M1 (variable j). Model M3 is used with the outputs of models M1 and M2 as inputs x and y. The form of any of the models does not affect the implementation and they are components that may be re-used and provide some 'black box' functionality. Filters may be used to make sure the data is transformed from and to the SDS. This transformation may be done manually when implementing the filters by specifying an algorithm that may unify the values as well as putting them into a certain format and adding any required metadata. The development of this algorithm may be done manually for each model and once done the models can be linked together using the scientific data set.

Figure 6:
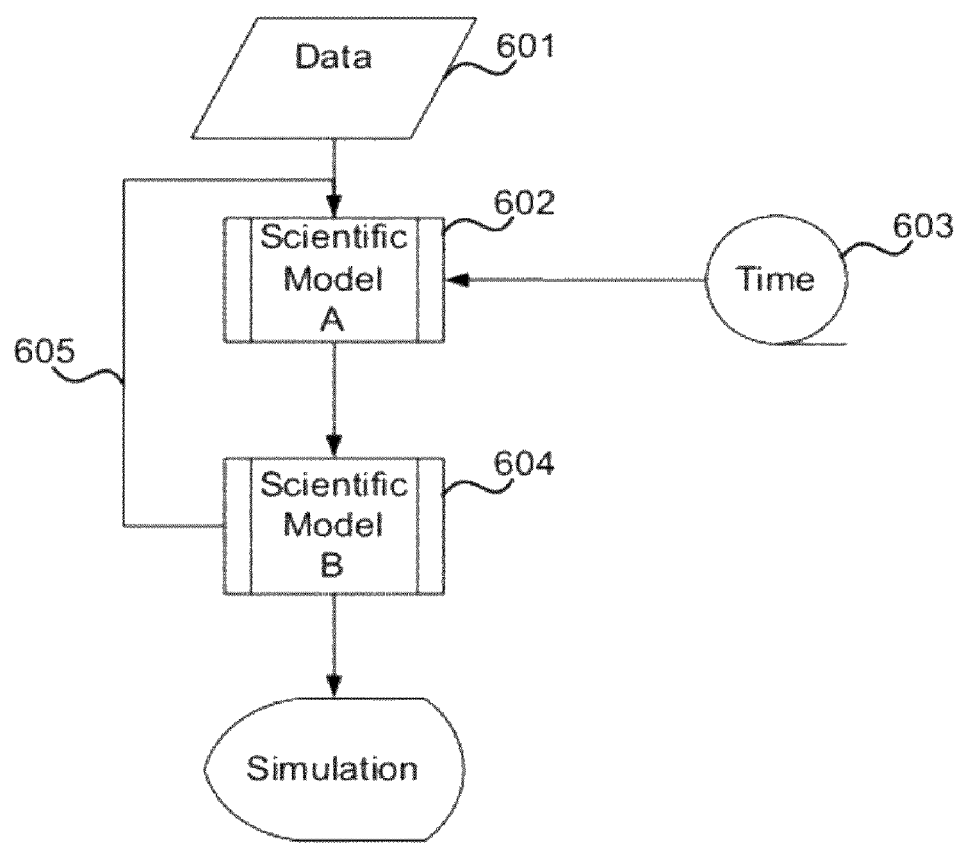
FIG. 6 is a flow diagram showing the incorporation of aspects of time into a system for generating a graphical virtual environment.

FIG. 6 is a flow diagram which shows how time can be incorporated into the methods and systems described herein. The input data 601 may for example be collected data based on real world observations and this is fed into Model A 602 which incorporates time as one of its parameters (as with f1 described above). Initially the model may be run at time t, but through the incorporation of time 603 into the model this may be shifted to run at time t+n and as a result a completely different data set may be used (compared to one which is used at time t). A second scientific model, Model B 604, uses the output of model A as an input. The input to this model is a calculation from model A at a time t+n. In this example, this model 604 does not require any time as input as it is based only on the inputs from the previous model(s). If model A is then re-run (as indicated by arrow 605) with new data, a further time increment is added, therefore the new calculated time will be t+n+m and again a new data set is used. This process may be repeated until the desired time (e.g. t+n+m+x) is reached.

The methods described above may further be used to test and/or verify the generated virtual environment, which may reduce further the amount of manual work (e.g. manual checking) that is required. For example, by allowing the scientific models to run forward in time, any errors in placement of particular plants will be automatically eliminated because the scientific model will cause the plants to vanish. In a particular example, if in the original input data, a palm tree was inadvertently included within an arctic region, a scientific model for plant growth in an arctic region would, if run forward in time, cause the palm tree to vanish (e.g. to die and be eliminated) as its attributes would not be compatible with the climate in the particular region. In another example, the verification may be performed by taking the output of the system and feeding it back into the system as input data. If the system results in error messages and is unable to generate the simulation data for use by the graphical simulation engine, then there is likely to be an error in the original input data. Additionally (or alternatively), if the system results in oscillating data (rather than a steady state case) when using this test input data, there is also likely to be an error in the original input data, and hence a problem with the output under test. These methods may also be used to test graphical virtual environments which may have been generated manually or using alternative methods to those described herein. In such an example, the environment under test may be input to the system described herein and if the result is not a stable environment, the environment under test may be considered to contain errors.

Existing graphical simulation engines use techniques to reduce computation based on the level of detail that is required for a particular region of a virtual environment, with objects closer to the viewer being displayed in much greater detail than those which are distant and with objects which are out of the field of view not being rendered at all. Such techniques are compatible with the methods described herein and these known techniques may be used in combination with the methods described herein.

Figure 7:
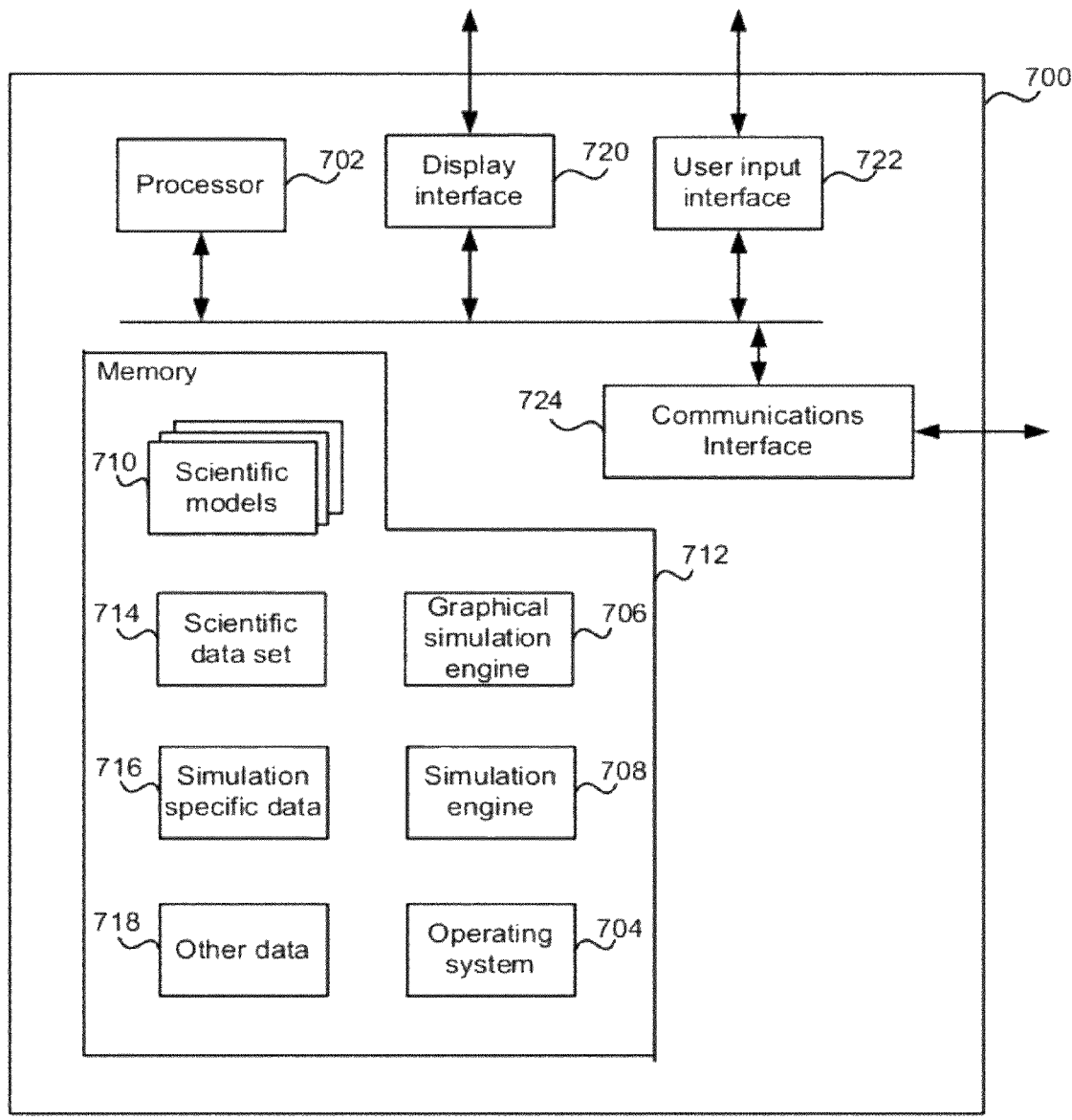
FIG. 7 illustrates an exemplary computing-based device in which embodiments of the methods described herein may be implemented.

FIG. 7 illustrates various components of an exemplary computing-based device 700 which may be implemented as any form of a computing and/or electronic device, and in which embodiments of the methods described above may be implemented. The computing-based device 700 may, for example, be a games console or a games server.

Computing-based device 700 comprises one or more processors 702 which may be microprocessors, controllers or any other suitable type of processors for processing computing executable instructions to control the operation of the device in order to run scientific models, generate simulation data and generate a graphical virtual environment. Platform software comprising an operating system 704 or any other suitable platform software may be provided at the computing-based device to enable application software, such as a graphical simulation engine 706 and simulation engine 708 which runs scientific models 710 to be executed on the device.

The computer executable instructions may be provided using any computer-readable media, such as memory 712. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 712 may be used to store the scientific models 710, the scientific data set 714, simulation specific data 716 and any other data 718 (e.g. user-defined parameters, data which is downloaded from remote sources etc).

The computing-based device 700 also comprises one or more interfaces, such as a display interface 720, a user input interface 722 and a communication interface 724. The display interface 720 is arranged to provide information for rendering the graphical virtual environment to a display device (not shown in FIG. 7) and dependent upon the type of computing-based device, the device may also comprise the display device (e.g. for portable games consoles). The user input interface 722 interfaces to a user input device (not shown in FIG. 7), such as a games controller, mouse or keyboard and is arranged to receive user input signals from such a device. The communication interface 724 is arranged to communicate with and/or to receive data from external data sources, such as online services, databases etc. Any data that is received may be stored within the memory 712 (e.g. as other data 718).

Although the present examples are described and illustrated herein as being implemented in a games server or games console, the system described is provided as an example and not a limitation. As those skilled in the art will appreciate, the present examples are suitable for application in a variety of different types of gaming systems and the methods and systems described above may also be used for applications other than computer gaming, such as for education or training (as described above) or scientific research.

It will be appreciated that whilst the techniques described herein are described as being used at run-time, in some applications the techniques may only be used at design time to generate a graphical virtual environment which is incorporated into a game/tool and is static at run-time. In such an example the methods described herein are used in the development cycle to generate a static snapshot of an environment.

Furthermore, although the techniques described above are described as being used to generate a graphical virtual environment, it will be appreciated that the techniques may also be applied to applications which generate other forms of graphical outputs or non-graphical virtual environments, e.g. computer simulations where the output is numerical. An example of such an application is a computer simulation that maps out statistics on tree growth and species diversity and provides a user with a numerical rather than graphical representation of the results.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradeable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of generating a graphical virtual environment comprising:
   receiving input data representative of a real physical environment;
   processing the input data using a combination of at least two different scientific models to generate simulation data, wherein the processing includes:
   running a first iteration of a first scientific model using at least a portion of the input data;
   outputting first scientific model data from the first scientific model into a data structure, the data structure comprising a plurality of data elements;
   extracting, via an input filter associated with a second scientific model, a subset of the plurality of data elements from the data structure;
   running the second scientific model using at least the subset of the plurality of data elements from the data structure;

outputting, via an output filter, second scientific model data from the second scientific model into the data structure;

running a second iteration of the first scientific model based at least in part on the second scientific model data output; and outputting updated first scientific model data into the data structure; and using a graphical simulation engine, generating a graphical virtual environment at least from the updated first scientific model data and the second scientific model data in the data structure.

2. A method according to claim 1, further comprising: displaying the graphical virtual environment within a computer game to a player of said computer game.

3. A method according to claim 1, wherein the plurality of data elements are in a pre-defined order and the first and second scientific models are each associated with selective data elements.

4. A method according to claim 1, wherein metadata is associated with each of the plurality of data elements, the metadata comprising provenance information for a value of the data element.

5. A method according to claim 3, further comprising: running a further scientific model using at least a second subset of the plurality of data elements from the data structure, the further scientific model comprising a third scientific model.

6. A method according to claim 1, wherein at least a portion of the input data comprises simulation specific data.

7. A method according to claim 1, wherein processing the input data using the combination of the at least two different scientific models to generate the simulation data comprises, at runtime:

using the input data, the combination of the at least two different scientific models, and available time data, extrapolating at least one of past and future parameters associated with the graphical virtual environment to generate the simulation data, wherein at least part of the available time data is user-defined.

8. A method according to claim 1, further comprising: using different combinations of the at least two different scientific models to generate the simulation data for different regions of the graphical virtual environment.

9. A system for generating a graphical virtual environment comprising:
a processor;
a memory;
a plurality of different scientific models;
a simulation engine arranged to:
import input data from at least one data source and process at least a portion of the input data using at least a first scientific model and a second scientific model of the plurality of different scientific models to generate simulation data; and
implement multiple processing iterations of at least the first scientific model, wherein a first iteration of the first scientific model uses the portion of the input data imported from the at least one data source and a second iteration of the first scientific model uses the portion of the input data subsequent to processing by the second scientific model;
a data structure stored in the memory, the data structure comprising a plurality of data elements associated with the portion of the input data processed by the first scientific model and the second scientific model;
one or more input filters that extract subsets of the plurality of data elements from the data structure to be processed by the first scientific model and the second scientific model;
one or more output filters that output the processed subsets of the plurality of data elements from the first scientific model and the second scientific model subsequent to processing by the first scientific model and the second scientific model; and
a graphical simulation engine arranged to generate a graphical virtual environment from the plurality of data elements in the data structure.

10. A system according to claim 9, wherein the at least one data source comprises data representative of a real physical environment.

11. A system according to claim 9, wherein the at least one data source comprises a communication interface arranged to retrieve the input data from at least one of an online service and a remote data store.

12. A system according to claim 9, wherein the simulation engine is further arranged to use available time data to extrapolate at least one of past and future parameters associated with the graphical virtual environment to generate the simulation data, wherein at least part of the time data is user-defined.

13. A system according to claim 9, wherein:
the simulation engine comprises device-executable instructions stored in the memory which when executed cause the processor to import the input data from the at least one data source and process at least the portion of the input data using the first scientific model and the second scientific model to generate the simulation data; and
the graphical simulation engine comprises device-executable instructions stored in the memory which when executed cause the processor to generate the graphical virtual environment from the simulation data provided by the plurality of data elements in the data structure.

14. A system according to claim 13, further comprising a display interface arranged to render the graphical virtual environment on a display device.

15. A computer-readable media storing a computer program on one or more device memories, the computer program comprising device-executable instructions for performing a process comprising:
accessing input data, at least a portion of the input data being representative of a real physical environment;
processing the input data using at least two different scientific models to generate simulation data, wherein the processing includes:
extracting selective data from a data structure;
extrapolating at least one of past and future parameters associated with the input data based on time data;
processing a first iteration of a first scientific model using the selective data and the at least one of past and future parameters;
writing first model output data to the data structure subsequent to processing the first iteration of the first scientific model;
extracting, via an input filter associated with a second scientific model, at least a portion of the first model output data from the data structure;
processing an iteration of the second scientific model using the portion of the first model output data;
outputting, via an output filter, second model output data from the second scientific model to the data structure;

processing a second iteration of the first scientific model based at least in part on the second model output data; and subsequent to processing the second iteration of the first scientific model, outputting simulation data;

generating a 3D graphical virtual environment based at least in part on the simulation data, the 3D graphical virtual environment corresponding in part to the real physical environment at a future time or a past time; and causing a display of the 3D graphical virtual environment.

16. A computer-readable media storing a computer program according to claim 15, wherein the data structure comprises a plurality of data elements in a pre-defined order and metadata associated with each of the plurality of data elements for processing by the first scientific model and the second scientific model.

17. A computer-readable media storing a computer program according to claim 16, wherein the metadata associated with a data element comprises provenance information for a value of the data element.

18. A computer-readable media storing a computer program according to claim 15, wherein the time data further includes imported data from an external source, the imported data being associated with a particular time as defined by a user of the computer program.

19. A computer-readable media storing a computer program according to claim 15, wherein processing the input data using the at least two different scientific models to generate the simulation data comprises:

processing the input data using different combinations of the at least two different scientific models for different regions of the graphical virtual environment.

* * * * *